(12) United States Patent
Valgenti et al.

(10) Patent No.: US 9,948,664 B2
(45) Date of Patent: Apr. 17, 2018

(54) METHOD AND SYSTEM FOR CORRELATION AND MANAGEMENT OF DISTRIBUTED AND HETEROGENEOUS EVENTS

(71) Applicant: Petabi, Inc., Irvine, CA (US)

(72) Inventors: Victor C. Valgenti, Irvine, CA (US); Min Sik Kim, Irvine, CA (US)

(73) Assignee: Petabi, Inc., Irvine, CA (US)

( * ) Notice: Subject to any disclaimer, the term of this patent is extended or adjusted under 35 U.S.C. 154(b) by 170 days.

(21) Appl. No.: 15/206,878

(22) Filed: Jul. 11, 2016

(65) Prior Publication Data

US 2018/0013773 A1      Jan. 11, 2018

(51) Int. Cl.
*H04L 29/06*      (2006.01)

(52) U.S. Cl.
CPC ...... *H04L 63/1416* (2013.01); *H04L 63/1425* (2013.01)

(58) Field of Classification Search
CPC .......................... H04L 63/1416; H04L 63/1425
See application file for complete search history.

(56) References Cited

U.S. PATENT DOCUMENTS

| | | | | |
|---|---|---|---|---|
| 7,308,689 | B2 * | 12/2007 | Black | G06F 9/542 709/223 |
| 7,509,677 | B2 * | 3/2009 | Saurabh | G06F 21/552 709/223 |
| 7,607,169 | B1 * | 10/2009 | Njemanze | H04L 63/1416 726/22 |
| 8,528,077 | B1 * | 9/2013 | Tidwell | G06F 21/552 726/22 |

(Continued)

OTHER PUBLICATIONS

Alberto Borghetti, Carlo Alberto Nucci, Mario Paolone, and Marina Bernardi, A Statistical Approach for Estimating the Correlation between Lightning and Faults in Power Distribution Systems, Proceedings of the International Conference on Probabilistic Methods Applied to Power Systems, pp. 1-7, 2006.

(Continued)

*Primary Examiner* — Ali Shayanfar
(74) *Attorney, Agent, or Firm* — KORUS Patent, LLC; Seong Il Jeong

(57) ABSTRACT

Event processing is a vital aspect of modern information systems, but is poorly supported and homogenous in nature. The present disclosure recognizes that any detector speaks a language of events. This language of events can be translated into a "Universal Language" such that events from multiple arbitrary detectors may be compared together. The present disclosure uses regular expressions to explore possible relations and patterns across events and across time. The present disclosure further describes a hierarchical architecture such that the events from peer detectors are aggregated and collated and only conglomerate events, those events matching inter- or intra-detector behaviors, are propagated upstream in the hierarchy. Ultimately, this architecture offers a means to merge the event data from an arbitrary number of heterogeneous detectors into a meaningful stream of events that reflect wider breadth of knowledge, improved scalability, and provide a wider context for expression of patterns through the use of regular expressions.

8 Claims, 7 Drawing Sheets

(56) References Cited

U.S. PATENT DOCUMENTS

| | | | | |
|---|---|---|---|---|
| 8,600,731 | B2* | 12/2013 | Cunnington | H04L 12/1822 704/2 |
| 8,688,476 | B2* | 4/2014 | Cinqualbre | G06Q 50/24 705/2 |
| 9,100,422 | B1* | 8/2015 | Tidwell | H04L 63/1408 |
| 9,591,010 | B1* | 3/2017 | Muddu | H04L 63/1425 |
| 2010/0082739 | A1* | 4/2010 | Martin | H04W 36/005 709/203 |
| 2010/0207761 | A1* | 8/2010 | Richman | G08B 13/19608 340/541 |
| 2013/0097306 | A1* | 4/2013 | Dhunay | H04L 12/6418 709/224 |
| 2014/0172516 | A1* | 6/2014 | Davison | G06Q 50/205 705/7.39 |
| 2016/0132487 | A1* | 5/2016 | Nauze | G06F 17/2735 704/4 |

OTHER PUBLICATIONS

Imen Brahmi, Sadok Ben Yahia, Hamed Aouadi, and Pascal Poncelet, Towards a Multiagent-based Distributed Intrusion Detection System using Data Mining Approaches, Proceedings of the International Conference on Agents and Data Mining Interaction, pp. 173-194, 2012.

Massimo Ficco, Alessandro Daidone, Luigi Coppolino, Luigi Romano, and Adrea Bondavalli, An Event Correlation Approach for Fault Diagnosis in SCADA Infrastructure, Proceedings of the European Workshop on Dependable Computing, pp. 15-20, 2011.

Jereme N. Haack, Glenn A. Fink, Wendy M. Maiden, Steven J. Templeton, and Errin W. Fulp, Ant-based Cyber Security, Proceedings of the International Conference on Information Technology: New Generations, pp. 318-926, 2011.

Gabriel Jacobson and Mark D. Weissman, Alarm Correlation, IEEE Network, pp. 52-59, 1993.

Guofei Jiang and George Cybenko, Temporal and Spatial Distributed Event Correlation for Network Security, Proceedings of the American Control Conference, vol. 2, pp. 996-1001, 2004.

G. Liu, A. K. Mok, and E. J. Yang, Composite Events for Network Event Correlation, Proceedings of the International Symposium on Integrated Network Management, pp. 247-260, 1999.

John C. McEachen, Cheng Kah Wai, and Vonda L. Olsavsky, Aggregating Distributed Sensor Data for Network Intrusion Detection, Proceedings of the Symposium on Computers and Communications, pp. 916-922, 2006.

Francisco Pereira, Filipe Rodrigues, Evgheni Polisciuc, and Moshe Ben-Akiva, Why so many people? Explaining non-habitual Transport Overcrowding with Internet Data, Transactions on Intelligent Transportation Systems, pp. 1370-1379, 2015.

Rui Ren, Xiaoyu Fu, Jiangfeng Zhan, and Wei Zhou, LogMaster: Mining Event Correlations in Logs of Large-scale Cluster Systems., Proceedings of the Symposium on Reliable Distributed Systems, pp. 71-80, 2012.

Douglas Schales, Xin Hu, Jiyong Jang, Reiner Sailer, Marc Stoecklin, and Ting Wang, FCCE: Highly Scalable Distributed Feature Collection and Correlation Engine for Low Latency Big Data Analytics, IBM Research Report RC25456, 2014.

Florian Skopik and Roman Fiedler, Intrusion Detection in Distributed Systems using Fingerprinting and Massive Event Correlation, Proceedings of INFORMATIK, 2013.

Risto Vaarandi and Michael R. Grimaila, Security Event Processing with Simple Event Correlator, ISSA Journal, pp. 30-37, 2012.

Eiko Yoneki and Jean Bacon, Unified Semantics for Event Correlation Over Time and Space in Hybrid Network Environments, IFIP International Conference on Cooperative Information Systems, vol. 3760 of Lecture Notes in Computer Science, pp. 366-384, 2005.

* cited by examiner

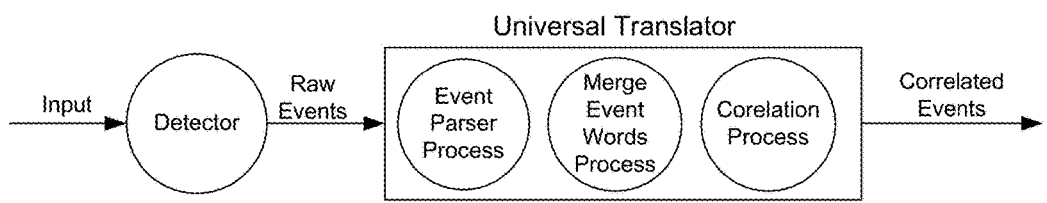

FIG. 1

```
1  Jul 24 10:18:27 server one sshd[36471]: input_userauth_request: invalid user supervisor 2  Jul 24 10:19:04 server one sshd[36473]: input_userauth_request: invalid user supervisor 3  Jul 24 10:20:15 server one sshd[36491]: input_userauth_request: invalid user anonymous 4  Jul 24 10:21:12 server one sshd[36515]: error: PAM: authentication error for validuser
   from wsip-x.x.x.x.net 5  Jul 24 10:22:00 server one sshd[36532]: Accepted keyboard-interactive/pam for validuser
   from x.x.x.x port 41831 ssh2

6  Jul 24 10:22:28 server one su: validuser to root on /dev/pts/9
```

FIG. 2

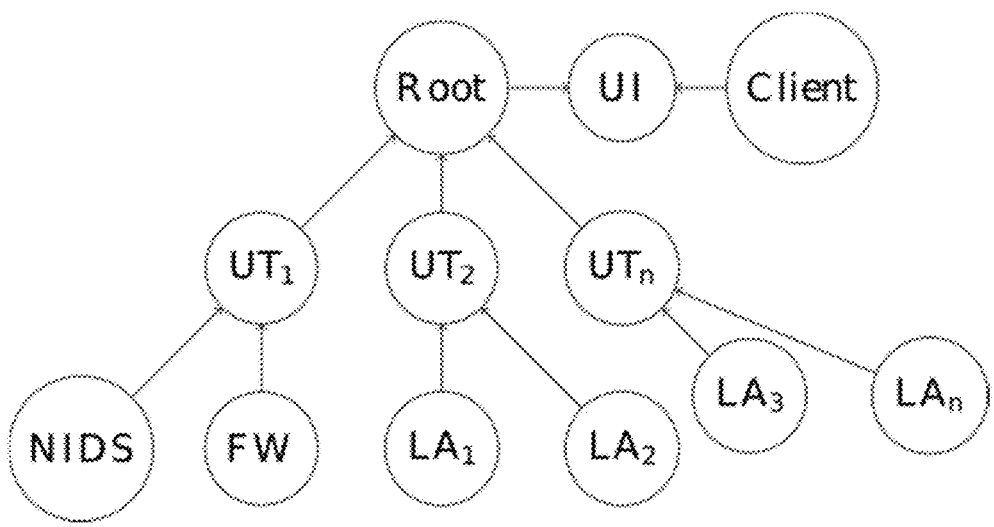
FIG. 10
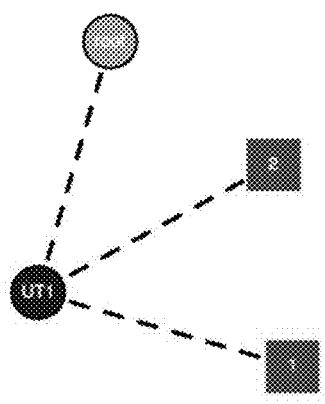
FIG. 11

METHOD AND SYSTEM FOR CORRELATION AND MANAGEMENT OF DISTRIBUTED AND HETEROGENEOUS EVENTS

BACKGROUND OF THE DISCLOSURE

Field of the Invention

The present disclosure relates to the field of network event correlation and network security as a method to manage and correlate events from heterogeneous sources such that a broader view of system state may be achieved. However, the present disclosure extends to any system that correlates events from multiple homogenous or heterogeneous detectors regardless of the specific application of system so long as those events may be converted to textual representations of the detected phenomena.

Description of the Related Art

The following is a tabulation of some related art that presently appears relevant:

Non-Patent Literature Documents

Alberto Borghetti, Carlo Alberto Nucci, Mario Paolone, and Marina Bernardi, "A Statistical Approach for Estimating the Correlation between Lightning and Faults in Power Distribution Systems", *Proceedings of the International Conference on Probabilistic Methods Applied to Power Systems*, pages 1-7, 2006.

Imen Brahmi, Sadok Ben Yahia, Hamed Aouadi, and Pascal Poncelet, "Towards a Multiagent-based Distributed Intrusion Detection System using Data Mining Approaches", *Proceedings of the International Conference on Agents and Data Mining Interaction*, pages 173-194, 2012.

Massimo Ficco, Alessandro Daidone, Luigi Coppolino, Luigi Romano, and Adrea Bondavalli, "An Event Correlation Approach for Fault Diagnosis in SCADA Infrastructure", *Proceedings of the European Workshop on Dependable Computing*, pages 15-20, 2011.

Jereme N. Haack, Glenn A. Fink, Wendy M. Maiden, Steven J. Templeton, and Errin W. Fulp, "Ant-based Cyber Security", *Proceedings of the International Conference on Information Technology: New Generations*, pages 918-926, 2011.

Gabriel Jacobson and Mark D. Weissman, "Alarm Correlation", *IEEE Network*, pages 52-59, 1993.

Guofei Jiang and George Cybenko, "Temporal and Spatial Distributed Event Correlation for Network Security", *Proceedings of the American Control Conference*, vol 2, pages 996-1001, 2004.

G. Liu, A. K. Mok, and E. J. Yang, "Composite Events for Network Event Correlation", *Proceedings of the International Symposium on Integrated Network Management*, pages 247-260, 1999.

John C. McEachen, Cheng Kah Wai, and Vonda L. Olsaysky, "Aggregating Distributed Sensor Data for Network Intrusion Detection", *Proceedings of the Symposium on Computers and Communications*, pages 916-922, 2006.

Francisco Pereira, Filipe Rodrigues, Evgheni Polisciuc, and Moshe Ben-Akiva, "Why so many people? Explaining non-habitual Transport Overcrowding with Internet Data", *Transactions on Intelligent Transportation Systems*, pages 1370-1379, 2015.

Rui Ren, Xiaoyu Fu, Jiangfeng Zhan, and Wei Zhou, "LogMaster: Mining Event Correlations in Logs of Large-scale Cluster Systems.", *Proceedings of the Symposium on Reliable Distributed Systems*, pages 71-80, 2012.

Douglas Schales, Xin Hu, Jiyong Jang, Reiner Sailer, Marc Stoecklin, and Ting Wang, "FCCE: Highly Scalable Distributed Feature Collection and Correlation Engine for Low Latency Big Data Analytics", *IBM Research Report RC25456*, 2014.

Florian Skopik and Roman Fiedler, "Intrusion Detection in Distributed Systems using Fingerprinting and Massive Event Correlation", *Proceedings of INFORAJATIK*, 2013.

Risto Vaarandi and Michael R. Grimaila, "Security Event Processing with Simple Event Correlator", *ISSA Journal*, pages 30-37, 2012.

Eiko Yoneki and Jean Bacon, "Unified Semantics for Event Correlation Over Time and Space in Hybrid Network Environments", *IFIP International Conference on Cooperative Information Systems*, vol 3760 of Lecture Notes in Computer Science, pages 366-384, 2005.

Event correlation has been a mainstay in network management for decades with early work aggregating and collating alarms to reduce the flood of alerts caused by cascading system failures (Jakobson et al.). The primary purpose of event correlation is to reduce the set of all events into a concise set of informational updates that highlight root cause while maintaining minimal redundancy. Event processing typically acts upon log files or informational network messages like the Simple Network Message Protocol (SNMP) (Jakobson et al., Liu et al., Jiang et al., Ren et al., and Vaarandi et al.). Most event correlation techniques employ some form of spatio-temporal correlation to link events together; with data-mining algorithms and clustering becoming more popular as the means to achieve effective correlation (Liu et al., Jiang et al., and Schales et al.).

In recent years, event correlation has begun to expand into different venues. Smart Power Grids can make use of event correlation to provide a better sense of system state (Ficco et al.). More interestingly, Borghetti et al. demonstrated the use of lightning strike events, using a lightning location system, and the correlation of those events to fluctuations in nearby power grid facilities to help predict the effects of lightning on the power grid. Pereira et al. illustrated how local events in a city, like a concert, related to unexpected heavy utilization of public transit and how particular internet data can correlate to this increased utilization. These new venues for event correlation demonstrate the expanding use and need for heterogeneous event correlation systems.

Network security has begun to expand into larger, distributed systems as single perimeter defense is insufficient to modern security needs. Distributed Network Intrusion Detection Systems (DNIDS) might aggregate data from a distributed network (Mceachen et al.), or employ multiple agents and data mining (Haack et al., Brahmi et al., Skopik et al., and Schales et al.), though most often the security events are still collated at a single centralized system. Despite the popularity of event management significant problems still exist. First, most DNIDS are homogeneous in the events they examine. In other words, a DNIDS is simply the same detector run at different places on the network. Thus, what happens is that event correlation is either attached to a DNIDS as a parallel system with little collaboration, or the output of the DNIDS is piped directly into an event correlation system specifically designed for that particular DNIDS (i.e. homogenous). Neither circumstance supports the idea of heterogeneous events or detectors, or a system to tie them together except in a post-processing stage through the use of a relational database as is typically done with commercial products.

Yoneki et al. advanced a universal semantics for event correlation. They developed a set of Boolean logic components that can be applied to events in wireless sensor networks to aid in the real-time query of events. A significant effort was made on their part to ensure time-validity so that the ordering of events would remain intact as such information is vitally important in some wireless sensor networks, like motion detectors, where the sequence of events can determine direction and speed of movement. However, their approach is still homogenous to the given framework and is thus rigid. Further, the Boolean logic is limited to Boolean comparisons which lacks the ability to search for dynamic patterns such as those represented by regular expressions. Finally, their system provides an on-demand query system of a wireless network rather than a system of correlation and management.

SUMMARY OF THE DISCLOSURE

The present disclosure relates to the abstraction of system events across an entire information system into an abstract syntax that is universal such that heterogeneous events can be compared to other events from any device or location in the system. As such, the present disclosure pertains to any system where homogenous or heterogeneous events might be processed in a distributed manner with the purpose of improving and broadening system understanding as well as managing, collating, aggregating, and correlating those events. In particular, the present disclosure is designed for processing the security and management events of a distributed information system consisting of multiple servers, personal computers, and other electronic devices attached to a proprietary network.

The present disclosure recognizes that any detector, be it a logging system, a sensor, a Network Intrusion Detection System (NIDS), or a router, will speak a language of events. The present disclosure further recognizes that these languages can be translated into a universal language that can be shared among detectors. The present disclosure creates a framework for tying together a set of heterogeneous detectors into a single system such that event correlation can occur both locally and centrally, across detectors, and across time. Further, the present disclosure builds such a system to provide enhanced system awareness for an information system.

The present disclosure makes no assumptions about detectors. Any device that can record system state in an electronic format can serve as a detector. Further, the present disclosure adopts the use of regular expressions to search for event correlation rather than the Boolean algebra, as employed by Yoneki et al. The Boolean algebra can be represented in regular expressions in entirety, but the reverse is not true; especially in the case of alternation. Third, in the present disclosure time is abstracted to a system-level attribute that can be tuned to the needs of the system. As such, sequences are preserved within the languages produced by the detectors, and preserved at whatever abstraction level of timing is relevant to the system. This abstraction of time provides for easier management of time among events and promotes natural aggregation and correlation of events. Finally, the present disclosure also provides for a framework where multiple detectors and/or event correlation systems can be linked together in a hierarchical model that is, at once, both distributed and centralized.

In essence, the present disclosure adopts a vastly different approach from the typical database-dominated approaches currently in use for event management. The present disclosure translates events into an abstract syntax in order to provide a universal language for communicating across normal system boundaries. The present disclosure then uses regular expressions to express relations among events. The expressive power of regular expressions allows for a limitless ability to define correlations between events across time.

Simplistically, the present disclosure works in the following manner. A stream of events from some number of detectors are fed into the system. In this case, a detector can be anything that reports on some condition in the system. A mapping of events is maintained in the system such that any significant event can be directly mapped to a single abstract symbol. This represents the first aspect of the present disclosure, the mapping of significant events to an abstract symbol. The second aspect of the present disclosure is to preserve the spatiality of events by decorating every event with the ID of the detector that emits the event. As such, every event is then represented as a pair of abstract symbols, one representing the detector and the other the event. The third aspect of the present disclosure is to merge all events from a plurality of detectors into a single language. This is done by simply combining the abstracted symbols from each detector into a single string of abstracted symbols. The fourth aspect of the present disclosure is to preserve the order of events through the use of fixed time-boundaries where all events that occur within a time-boundary are considered to have happened simultaneously (as far as the system is concerned). This abstracted time period is represented in the set of abstracted symbols through the use of a symbol, called $\tau'$ (tau prime), such that all abstracted symbols that occur between two $\tau'$ symbols are considered to have occurred in the same abstracted time period that might represent some milliseconds to months depending on the system settings. This allows timing of events to be preserved across detectors, out to the precision of the time period. It should be noted that without this simplification of timing an external system is required to maintain synchronized time across all nodes in the system. The fifth aspect of the present disclosure is that patterns of interest among the events can be written as regular expressions. Those regular expressions can then process the language created from the detectors to identify inter- or intra-detector events, to aggregate events, or collate events. Patterns that match represent new, conglomerate events. In other words, these matched events represent behaviors across multiple detectors across time for some spatially constrained location in the network. These matched conglomerate events can now serve as input into higher tiers in the system creating a naturally hierarchical system where each higher level in the system represents greater information density in the events. In this manner, the results of the regular expression matching can become its own detector language. Given all of these prior aspects it becomes possible to realize the final aspect of the present disclosure which is a fully distributed architecture such that the events from any detector can spread through the system to be processed and compared with the events from any detector system wide.

BRIEF DESCRIPTION OF THE DRAWINGS

FIG. 1 provides an illustration of the Universal Translator process as it accepts events from detectors, parses those events, merges them into a Merged Event Word, performs correlation on the Event Window, and then ultimately outputs any detected Conglomerate Events.

FIG. 2 is a simplified excerpt from an authorization log file for hypothetical server one.

FIG. 10 demonstrates a second use case where the system ties together the security information from some n servers for an organization. Note in this figure UI stands for the User Interface (the web user interface into this system), NIDS stands for Network Intrusion Detection System, FW stands for Firewall (specifically firewall alerts and logs), and LA stands for Log Analyzer.

FIG. 11 provides a screenshot of the prototype web interface into the prototype system. In the prototype circles represent Universal Translators and squares represent detectors.

DETAILED DESCRIPTION OF THE EMBODIMENTS

Definitions

Figures 3, 4:
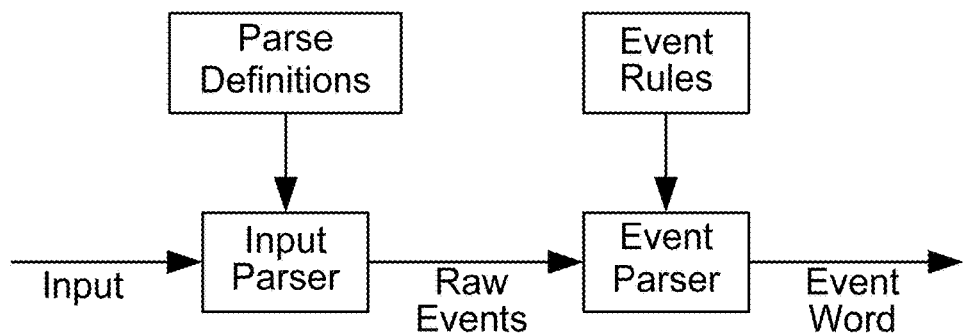
FIG. 3 is a simplified excerpt from an authorization log file for hypothetical server two.
FIG. 4 illustrates an overview of the event parsing process where the raw events are quantified and mapped to event words in the system.

1. Detector: Any device or process that monitors and reports on one or many system phenomena.
2. Raw Event: Any message reported by a detector. It is assumed that an event can be written as an electronic file.
3. Event: A Raw Event that matches to a particular predefined pattern and is considered significant to the system.
4. Abstract Symbol: A symbol used to represent an event, detector, or time boundary.
5. Event Word: A series of zero or more abstract symbols produced by parsing of raw events for some time period.
6. Merged Event Word: A series of event words produced by more than one detector, for a single time period, that have been concatenated together to create a single string of abstract symbols representing all of the events that occurred across some n detectors for the given time period.
7. Event Window: A series of consecutive Merged Event Words for zero or more time periods. The Event Window has a maximum size such that the Event Window will never have Merged Event Words for more consecutive time periods than the maximum size. The last (rightmost) Merged Event Word in the Event Window is always the most current Merged Event Word and the first (leftmost) Merged Event Word is the oldest. Each Merged Event Word in the Event Window is separated by a τ' (tau prime) symbol.
8. Conglomerate Event: An event defined by a regular expression using the abstract symbols from detector events to describe inter- or intra-detector behaviors.
9. Universal Translator: A process that reads one or more event streams from one or more detectors, translates all events to abstract symbols, creates event words for each detector, merges those words into a single merged event word, and then identifies correlations among events using the regular expressions defined by conglomerate events. The set of matched Conglomerate Events is then emitted by the Universal Translator and can serve as an input into another Universal Translator, or as a correlated result upon which action may be defined.

The present disclosure recognizes that any detector within a system speaks a language of events. The present disclosure further recognizes that this language can be abstracted away from the original event transcription to an abstract symbol that preserves the idea of the event without the specifics. Given knowledge of inter- or intra-event behaviors it is possible to craft regular expressions to describe the patterns among a stream of such translated events. The ultimate impact of this abstraction is that any system phenomena can be abstracted out to a universal language and the events from multiple detectors can be compared across normal system boundaries without hindrance.

The primary machine of the present disclosure is a process referred to as a Universal Translator. A Universal Translator is both a translator of raw event streams into the abstract syntax as well as a detector. The Universal Translator is an independent process that is run on a single host and will aggregate the event streams of one or more detectors. A distributed system can then be created from chaining a series of Universal Translators together because the output of any Universal Translator can serve as the input into another. FIG. 1 illustrates the basic process of the Universal Translator.

I. Method for Converting Events into an Abstract Syntax.

A detector will emit events as it detects specified behaviors within the purview of its monitoring. Detected events are system defined. In other words, the events that a detector can detect are known prior to detection. Simplistically, a fire alarm can detect the presence of smoke and heat, both of which imply a fire. As such, the event that a fire alarm can detect is known prior to any event triggering. Further, we note that an event can have meaning regardless of how it is described in actuality. For example, a fire alarm is typically realized through sirens and flashing lights. However, the present disclosure recognizes that this event could also be abstracted to an abstract symbol like a (alpha). So long as system stake-holders are aware of the meaning of α, then α can be interchanged for a fire alarm event. The benefit is that a is generic and not constrained by system boundaries, while sirens and flashing lights are system constrained. As such, α could be compared together with β which might represent an electrical failure in a building. Thus, if one were monitoring both systems and saw α following β then it might imply that the fire alarm is more likely to be real (not a false alarm) over just an instance where a appears without any accompaniment.

The present disclosure recognizes that significant events, those events we care about, are pre-defined. As such, it is possible to create a table for any set of arbitrary events for some detectors where the table maps any raw event to an abstract symbol or ignores the raw event if no such mapping exists. We note that the set of raw events produced by any detector may be much larger than the set of significant events. In other words, there may be many raw events we simply do not translate as they do not signify important phenomena. As such, when we speak of events from here forward we are discussing significant events with the implicit understanding that raw events that match to no pattern during translation are ignored within the system.

TABLE 1

An example mapping system login events to abstract symbols

| Event ID | Pattern | Description | Abstract Symbol |
|---|---|---|---|
| 1 | error:PAM:authentication error for | Valid User ID failed to supply correct credentials | A |
| 2 | input_userauth_request: invalid user | Invalid User ID login attempt, possible break-in attempt | B |
| 3 | Accepted keyboard-interactive/pam for | Successful Login by valid User ID | C |
| 4 | su: BAD SU | Failed attempt to switch to super user account | D |
| 5 | su: \w+ to root | Successful switch to the super user account. | E |

The present disclosure recognizes that events are pre-defined. As such, it is possible to create a table for any set of arbitrary events for some detector where said table maps any event to an abstract symbol. Table 1 is an example of such a table describing a small set of possible login events. Each possible event is known so it is a simple procedure to create a pattern to identify these events from the set of raw events and assign an abstract symbol to each event. In this case, the events are derived from the authorization log of a server. The pattern denotes the significant event that can be found within any raw event entry. Lines within the authorization log that match a pattern represent real instances of the particular event occurring. During processing of raw events each raw event is compared to the set of defined patterns and a simple lookup to the table based on the Event ID can then be used to identify and produce the abstract symbol for any matched pattern. In this way a set of raw events can be directly translated into a sequence of abstracted symbols where the leftmost symbol represents the oldest event and the rightmost symbol represents the most recent event with sequence preserved from left to right. FIG. 2 illustrates a simplified authorization log file. Lines 1-3, numbered in the figure, represent invalid user login attempts. Line 4 demonstrates a failed login attempt by a valid user, while Line 5 shows a successful login and Line 6 a successful escalation to the super user account. FIG. 3 represents a similar log file for Server 2 and will be discussed later. Regardless, given the mapping from Table 1 and the log file as illustrated by FIG. 2, this would produce the event word "BBBACE" for this small sample of an authorization event log.

FIG. 4 provides an overview of the event parsing process where the raw events are quantified and mapped to an event word. The raw output from the detector is input into the event parser. The parse rules define how to read that input (i.e. what constitutes a single raw event) as well as extracting timestamps for the raw events. This allows the event parser to properly read each raw event. Each raw event is then read and compared to all patterns defined for that detector. When any pattern matches, the abstract symbol for the matched pattern (as defined in the parsing rules) is output to the event word for that detector.

Figure 5:
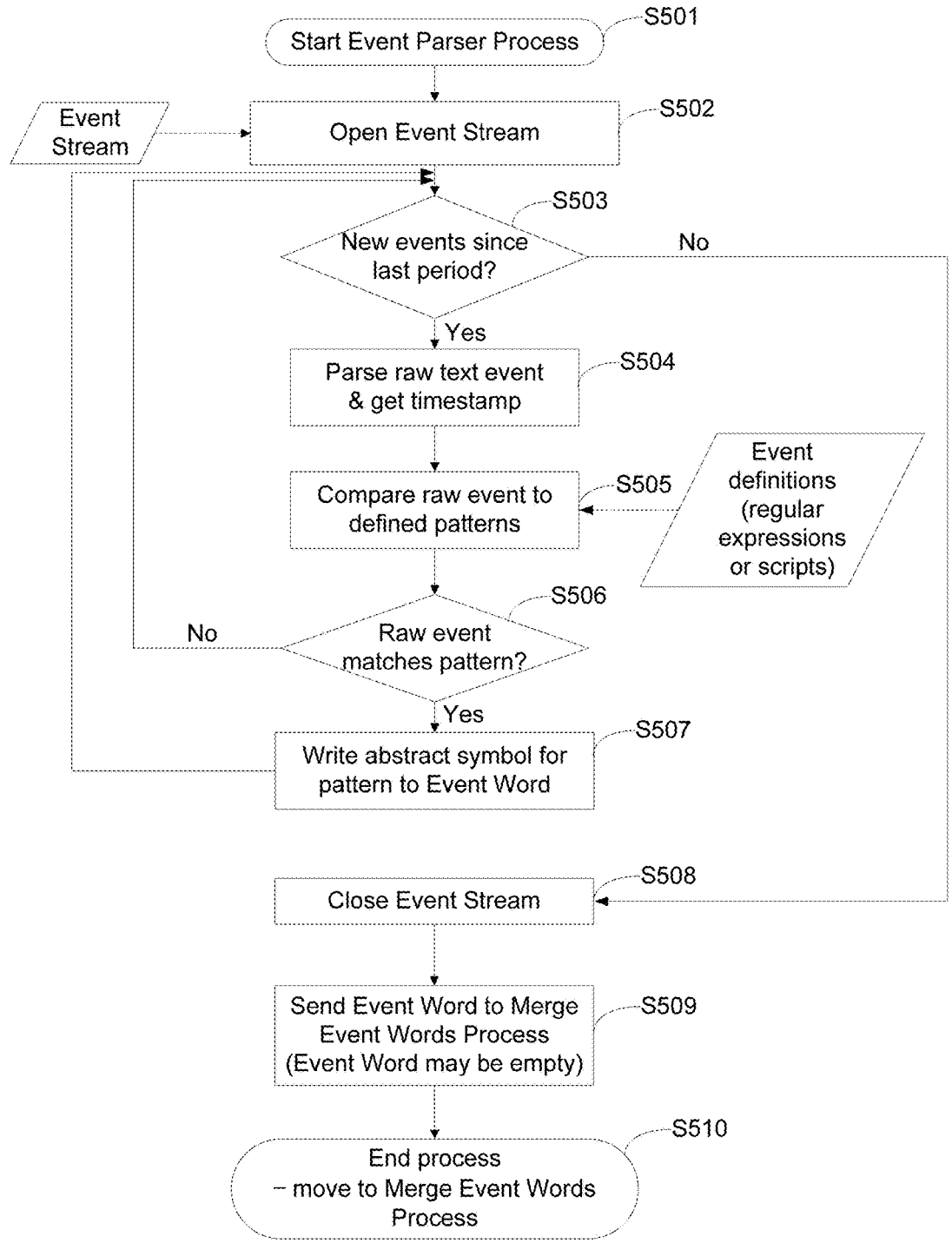
FIG. 5 portrays the process of parsing a detector's raw events into abstract symbols.

FIG. 5 is a flow chart detailing the process of parsing a detector's raw events into abstract symbols. Once every time period the event parser process initiates (S501) which then causes all raw events that occurred in the last time period to be processed. This is done by opening the raw event stream (S502) which may be a text file or some buffered output stream from the detector. If there are raw events in the raw event stream then each raw event is processed one by one (S503). The timestamp and raw event text is pulled from the raw event (S504) and then all relevant event rules are compared to the raw event (S505). If raw event matches a pattern (S506) then the abstract symbol associated with the pattern is written to the event word for the detector for that time period (S507). Once all of the raw events have been processed for the time period, then the raw event stream is closed (S508), the event word for this detector is forwarded to the Merge Event Words process (S509), and the process finishes (S510). Note, it is possible that the event word is empty, indicating that no raw events contained significant events for a time period.

In terms of the present disclosure an abstract symbol is represented as a single character using an encoding system such as ASCII if there are fewer than 128 events or a unicode type encoding if there are more. The system relies not on any specific encoding, only that the encoding is sufficient to present a single, unique symbol for every unique event that might be identified by the system at a local node.

II. Method for Preserving Spatial Boundaries of Events.

For a single detector, the origin of an event is obvious. However, if all of the event words produced from multiple detectors are merged into a single merged event word, then the obvious origin is lost. If all of the symbols used for each detector are unique, then there is still a clear indicator of origin. However, it is entirely possible, even probable, for multiple, identical, detectors to have their event words merged into a single merged event word. An example might be a set of collision sensors on a car where the only difference between the individual sensors is position. In such an instance, the merged event would make it impossible to distinguish between sensors without added notation. To solve this problem, the present disclosure prepends to every event abstract symbol a detector ID symbol. Thus, every emission, by any detector, becomes a pair of abstract symbols where the first abstract symbol represents the detector and the second the event. For example, consider again the example authorization log in FIG. 2. This created the event word "BBBACE". Given a mapping of detectors to Detector ID abstract symbols, as illustrated in Table 2, then the event word, with spatiality preserved, becomes "ZBZBZB-ZAZCZE". It should be noted that the Detector ID need only be unique to the Universal Translator that accepts the detector's input as only that Universal Translator need distinguish between the different detectors.

TABLE 2

An example mapping of detectors to abstract symbols (Detector ID)

| Detector ID (Abstract Symbol) | Host |
|---|---|
| Z | Server one at x.x.x.z |
| Y | Server two at x.x.x.y |
| X | Universal Translator One |

III. Method for Merging Events from Multiple Detectors.

Merging the event words from detectors requires some delicacy. In order to retain intra-detector precedence of events it is necessary that detector event words be concatenated to the merged event word with the least change possible. The event word for each detector is concatenated to the merged event word in a consistent order. We note that the specific ordering is unimportant so long as the ordering is consistent. Thus, the merged event word becomes simply the concatenation of all of the detector event words. For example, server one, as illustrated in FIG. 2, produces the event word "ZBZBZBZAZCZE" while server two, as illustrated in FIG. 3, produces the event word "YBYBYBYBYB". Merging these two words together would create the merged event word: "ZBZBZBZAZCZE YBYBYBYBYB". Each individual event word retains all of the sequential information of the non-merged event word and can be distinguished from the remainder of the merged event word by the detector ID symbol preceding each event for a specific detector.

Figure 6:
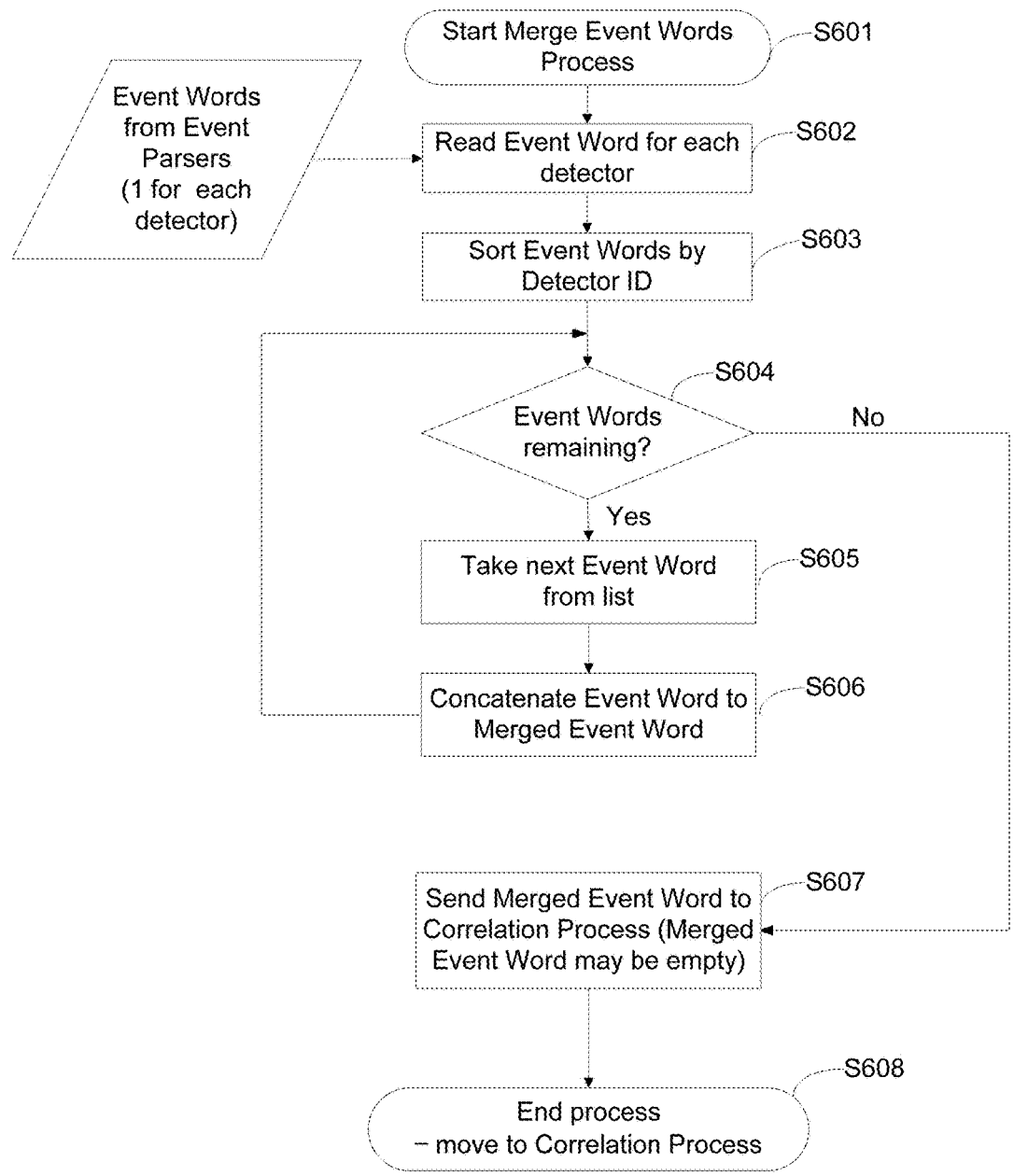
FIG. 6 illustrates the process of merging the Event Words from multiple detectors into a single Merged Event Word.

FIG. 6 provides a flowchart detailing the process of concatenating event words into a single Merged Event Word. The Event Words for each detector are read into memory (S602). The words are sorted into order by detector ID (S603). While there are words remaining in this list, the next word is removed from the list and concatenated to the Merged Event Word (S604-S606). When the list is empty, all Event Words have been merged to the Merged Event Word. The Merged Event Word is forwarded to the event correlation process (S607) and the Merge Event Words process finishes for the current time period (S608).

Once the Event Words for multiple detectors have been merged it becomes possible to look at the event words for multiple detectors together. However, one problem still remains. Temporal boundaries are retained within an event word in the form of sequence. The leftmost symbols are oldest and the rightmost symbols are most recent. However, after merging all event words into a single merged event word, this property no longer holds. For example, all events of server two illustrated in FIG. 3 have completed prior to the first event illustrated in FIG. 2. Thus, there must exist a method to preserve temporal boundaries within the event words and the merged event words.

IV. Method for Preserving Temporal Ordering Among Events.

One goal of the present disclosure is to provide means to aggregate, collate, and correlate events from disparate detectors to arrive at broader and deeper understanding of the system. Timing of events is important, but less important in an aggregate system, such as the proposed disclosure, over a real-time query system. To facilitate the preservation of timing of events the present disclosure creates a third abstraction, τ (tau), which represents an arbitrary, system-defined, period of time such that events that occur within that time period are considered to have occurred at roughly the same time. In other words, there is no strict distinction between timing for events that happen so close together that they end up in the same time period. For the present disclosure, τ is system-defined and may be as small as a second or as large as several months. Time periods are denoted within event words through the use of the τ' (tau prime) symbol which represents the time boundary for a time period. The universal translator maintains a history of Merged Event Words that it has processed. It concatenates these words into a single word, called the Event Window, inserting a τ' symbol between each Merged Event Word. Thus, the Event Window represents one or more consecutive Merged Event Words out to a system defined maximum number of time periods (as each Merged Event Word is the product of a time period). Whenever adding a new Merged Event Word to the Event Window would cause the Event Window to exceed its defined Window Size then the oldest Merged Event Word is dropped before adding the new merged Event Word.

Figure 7:
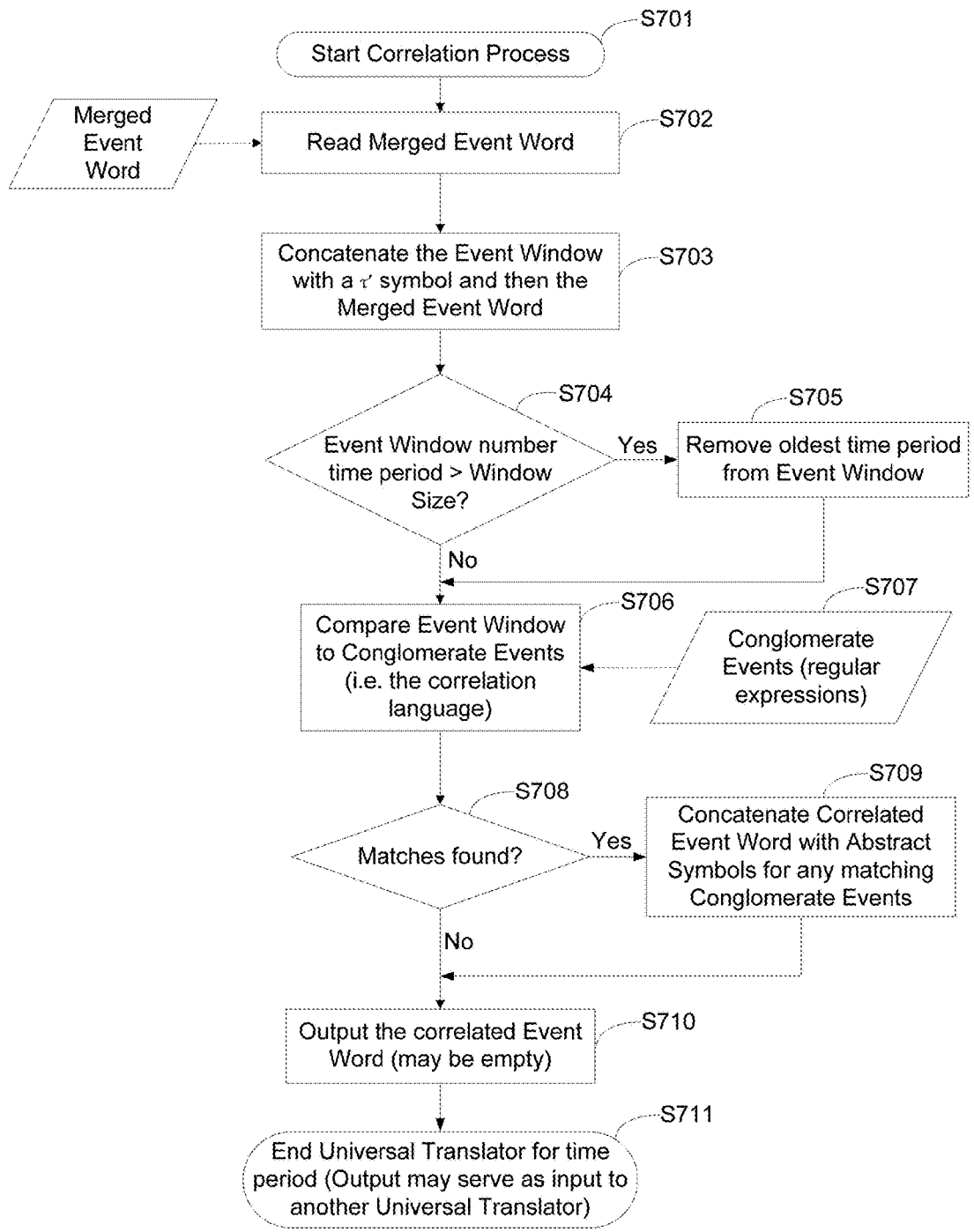
FIG. 7 details the process of performing correlation on the Event Window for some history of Merged Event Words.

FIG. 7 describes this process as well as the Event Correlation process. First, the Merged Event Word is read into memory (S702) and concatenated to the Event Window, using a τ' symbol to separate time period boundaries (S703). If the number of Merged Event Words in the Event Window is greater than the system-defined window size, then the oldest Merged Event Word (the leftmost) is dropped from the Event Window (S704-S705). Next, the correlator compares the Event Window to all defined Conglomerate Events (S706-S707). If there are any matches, then the abstract symbols for those Conglomerate Events are concatenated to the Event Word for the Universal Translator (S708-S709). Once all of the Conglomerate Event patterns have been processed, then the Event Word for the Universal Translator is output to serve as input into another Universal Translator or as some sort of system indicator which might generate a system response (S710). The process then finishes for the current time period (S711). Note, the Event Word for the Universal Translator may be empty if there were no events, or if no events met the correlation constraints (i.e. no Conglomerate Events matched to the Event Window).

For example, if τ, the time period, is set to one minute, then the event word for server one, as illustrated in FIG. 2, would be "τ'ZBτ'ZBτ'ZBτ'ZAτ'ZCZEτ'" while the event word for server two, as illustrated in FIG. 3 would be "τ'YBYBYBYBYBτ'τ'τ'τ'τ'" for the same five time periods. The Event Window for these five time periods would then become: "τ'YBYBYBYBYBZBτ'ZBτ'ZBτ'ZAτ'ZCZEτ'". The Event Window preserves timing out to one minute precision, in this case across five 1-minute time periods.

V. Method for Identifying Patterns within the Abstracted Event Syntax.

Once an Event Window exists, it is possible to use regular expressions to define behaviors among events. The regular expressions define behaviors among events, potentially across time.

TABLE 3

An example of mapping of conglomerate events to abstract symbols

| Event ID | Name | Description | Regular Expression | Abstract Symbol |
|---|---|---|---|---|
| 6 | Attempted Brute-force Break-in | 5 or more invalid user logins for a server in a single time period | /τ'.*(.B){5,}.*τ'/ | Q |

TABLE 3-continued

An example of mapping of conglomerate events to abstract symbols

| Event ID | Name | Description | Regular Expression | Abstract Symbol |
|---|---|---|---|---|
| 7 | Probable Broad-based Brute-force Attack | One or more invalid user logins on both server one and server two in the same time period | /τ'.*(YB)+.*(ZB)+. *τ'/ | R |
| 8 | Possible Guessed Password | Successful login in current or following time period after 3 or more failed login attempts | /τ'. *((.)A){3,}.*(\2C|τ'. *\2Cτ')/ | S |

Table 3 illustrates a set of 3 conglomerate events that define regular expressions used to identify some of these inter- and intra-event behaviors. For example, the first conglomerate event, Event ID 6, defined in Table 3 searches for an instance of 5 or more invalid user login attempts in a single time period. Such a series of events implies someone trying to force their way onto a server. The second conglomerate event, Event ID 7, defined in Table 3 searches for multiple invalid user login attempts in a single time-period on two different servers. This type of event implies a broader attack and may signify the need for more immediate action. Finally, the last conglomerate event, Event ID 8, looks for a successful login on a server after three unsuccessful logins within the current, or last, time period. This could signify an event where a brute-force attack has managed to successfully guess the password for an account and has managed a successful login. These regular expressions are applied to the Event Window to identify instances of these particular inter- and intra-event behaviors. For example, the Event Window produced from the sample logs as illustrated in FIG. 2 and FIG. 3 is: "τ'YBYBYBYBYBYBZBτ'ZBτ'ZBτ'ZAτ'ZCZEτ'". Applying our regular expressions we see two matches: Events 6 and 7 both match in the first time period of the merged event word. These represent conglomerate events that provide more information than any single event. This matching becomes the basis of events for an entire distributed system of event detectors. This process is further illustrated in FIG. 7.

VI. Method for a Distributed Architecture of Abstracted Event Detectors.

We noted that the merged event word, derived from the sample logs illustrated in FIG. 1 and FIG. 2, "τ'YBYBYBYBYBYBZBτ'ZBτ'ZBτ'ZAτ'ZCZEτ'" causes two matches from the set of conglomerate events described in Table 3. Specifically, Events 6 and 7, as defined in Table 3, match to the first time period of the merged event word. Since these events also have abstract symbols it is possible to create an event word from the matches found in the Event Window. Further, the process doing this matching is called a Universal Translator and can have its own mapping among Detector IDs as illustrated in Table 2. Given this, after matching the regular expressions of Events 6 and 7 to the Event Window we can create an Event Word for the Universal Translator: "τ'XQXRτ'τ'τ'τY'". This new event word is an aggregated version of all the events registered by the Universal Translator. In other words, it is a more concise representation depending on the inter- and intra-event behaviors defined by the conglomerate events.

Figure 8:
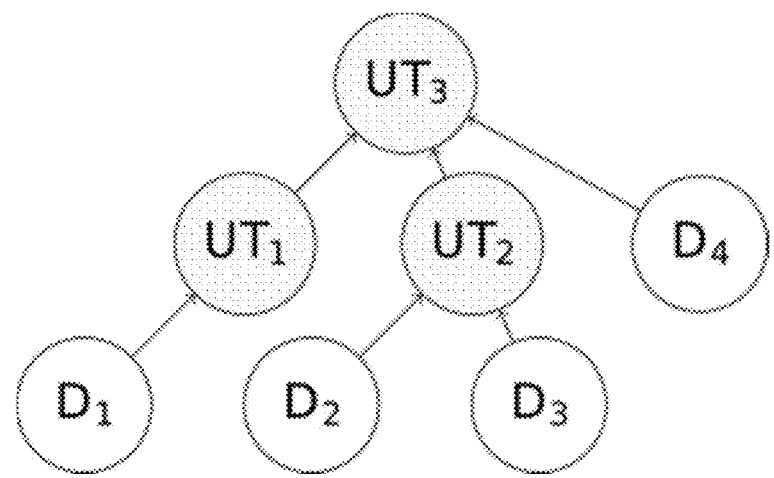
FIG. 8 shows how a series of Universal Translators and Detectors can be linked together to create a hierarchical distributed system.

More importantly, this new Event Word serves as an output for the Universal Translator. This output can then serve as input to another Universal Translator. In this manner it is possible to build a hierarchy of Universal Translators and detectors such that an arbitrary number of heterogeneous detectors can be merged together to create a distributed system of Universal Translators that can cover an entire system. A unique property of this environment is that any given Universal Translator need only know the languages of the detectors attached to that Universal Translator. As such, the system is easily scaled by adding new Universal Translator nodes. Further, data that propagates upstream is denser in the sense that more information has developed the events at higher levels (i.e. conglomerate events). FIG. 8 illustrates how detectors and Universal Translators can be pieced together to create a distributed system where UT stands for Universal Translator and D stands for Detector.

VII. Practical Deployment of this System

Figure 9:
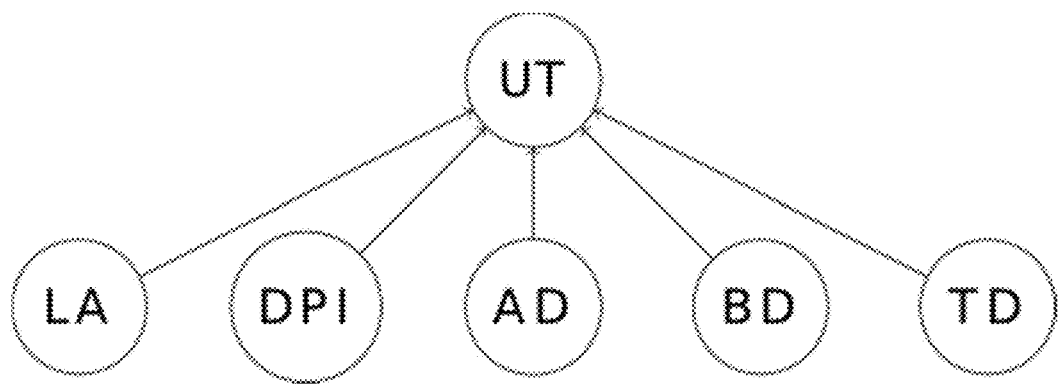
FIG. 9 illustrates a primary use case for employing this technique on a single host to tie together multiple security detectors into a single security status indicator. Note in this figure UT stands for Universal Translator, LA stands for Log Analyzer, DPI stands for Deep-packet Inspection, AD stands for Anomaly Detector, BD stands for Behavioral Detector, and TD stands for Trend Detector.

Thus far, we have described the mechanism enabling the present disclosure to function. To better demonstrate the practicality of this system we describe two use-cases currently employed with the prototype system as demonstrations of actual usage of this system. We note that the application of the current disclosure is not limited to these cases.

a. Use Case 1: Single Host Security Aggregator:

The Single Host Security Aggregator is a single system security product that pulls together the security information from multiple detectors to provide improved feedback to the user of the host machine. FIG. 9 provides a basic overview of this system. A single Universal Translator aggregates the data from multiple detectors. In our prototype we employ five separate detectors. First is a Log Analyzer (LA) that uses a set of rules to identify log events that are suspicious. Second is a Deep Packet Inspection (DPI) module that employs regular expression matching to identify network traffic arriving at the host (or leaving the host) containing suspicious patterns. Third is an Anomaly Detector (AD) that use Holt-Winters predictions to identify abnormal traffic patterns based on number of flows and number of packets to and from the host. Fourth is a Behavioral Detector (BD) that examines some number of user activities looking for inconsistencies. Finally, is a Trend Detector (TD) that examines various trends from a variety of feeds and increases vigilance when risk is perceived. The Universal Translator pulls all of these streams together and then correlates the results based on a set of regular expressions. Those regular expressions can be expanded or modified by the user to cover more possible correlations and to be customized to an individual host. This particular use case is designed to run in the background on personal computers and alert the user when security risks are detected and otherwise provide a clear view of the status of these five detectors.

b. Use Case 2: Server Security Aggregator

The Server Security Aggregator is a simple distributed system designed to track some number of co-located servers. A Universal Translator runs on each server and monitors some detectors. FIG. 10 provides an overview of this scenario. In particular, one Universal Translator is dedicated to handling the data from the Network Intrusion Detection System (NIDS) and any messages from a Firewall (FW). There may be multiple Universal Translators performing this role if there are multiple NIDS and FW. The other Universal Translators provide Log Analyzers (LA) for the other servers focusing on Authorization logs and Web logs. One Universal Translator resides on each server. The results from all of the Universal Translators feed into the Root translator. The root translator events then represent the events with the most information as they have been through correlation at two levels. Regardless, a web-based User Interface has also been developed so that a user (client) can monitor the system. FIG. 11 demonstrates the prototype user interface into this system where circle nodes represent Universal Translators and squares represent individual detectors.

What is claimed is:

1. A method for correlating and managing distributed and heterogeneous events, comprising:
    converting events from a plurality of detectors into corresponding abstract symbols creating event words,
    preserving spatial boundaries of the events,
    merging the event words into a single merged event word,
    preserving temporal ordering among the events by using fixed time boundaries where all the events that occur within a time-boundary are considered to have happened simultaneously,
    identifying correlations among conglomerate events and matching patterns, and
    emitting matched conglomerate events dependent on the results of matching the patterns,
    wherein the merging the event words into a single merged event word comprises:
    concatenating all the event words from all the plurality of detectors at a single universal translator into the single merged event word; and
    wherein the preserving temporal ordering among the events comprises:
    defining a system time period, $\tau$ (tau), that determines a precision at which the events will be temporally distinguished;
    defining an abstract symbol, $\tau'$ (tau prime), such that all the events that occur between two $\tau'$ symbols have occurred within the same time period of $\tau$ length; and
    merging the event words first by time period, then by a detector ID to create the merged event word that preserves timing information out to the precision of the system time period, $\tau$.

2. The method of claim 1, wherein the converting events from a plurality of detectors into corresponding abstract symbols comprises:
    mapping of the events to the abstract symbols, and
    parsing a raw event stream, looking up the abstract symbols, and writing the abstract symbols to an event word for one of the detectors.

3. The method of claim 1, wherein the preserving spatial boundaries of the events comprises:
    defining a mapping of each of the detectors within a system to the detector ID, and
    decorating every event emission from each detector with the detector ID by having every emission a pair of symbols, the detector ID and event abstract symbol, for the events.

4. The method of claim 1, wherein the identifying correlations among conglomerate events and matching patterns comprises:
    defining a set of the conglomerate events that have regular expressions representing inter- and/or intra-event patterns;
    providing abstract symbols for each of the set of the conglomerate events; and
    matching the defined regular expressions to the Event Window.

5. The method of claim 1, wherein the matched conglomerate events serve as an input into another universal translator.

6. A system for correlating and managing distributed and heterogeneous events, comprising:
    a plurality of detectors monitoring and reporting on one or many system phenomena, and
    a plurality of computer processors aggregating events from the plurality of detectors, the plurality of computer processors
    converting events from the plurality of detectors into corresponding abstract symbols creating event words,
    preserving spatial boundaries of the events,
    merging the event words into a single merged event word,
    preserving temporal ordering among the events by using fixed time boundaries where all the events that occur within a time-boundary are considered to have happened simultaneously,
    identifying correlations among conglomerate events and matching patterns, and
    emitting matched conglomerate events dependent on the results of matching the patterns,
    wherein the merging the event words into a single merged event word comprises:
    concatenating all the event words from all the plurality of detectors at a single universal translator into the single merged event word; and
    wherein the preserving temporal ordering among the events comprises:
    defining a system time period, $\tau$ (tau), that determines a precision at which the events will be temporally distinguished;
    defining an abstract symbol, $\tau'$ (tau prime), such that all the events that occur between two $\tau'$ symbols have occurred within the same time period of $\tau$ length; and
    merging the event words first by time period, then by a detector ID to create the merged event word that preserves timing information out to the precision of the system time period, $\tau$.

7. The system of claim 6, wherein the plurality of detectors comprises:
    a log analyzer using a set of rules to identify log events that are suspicious,
    a deep packet inspection module employing regular expression matching to identify network traffic, arriving or leaving at a host, containing suspicious patterns,
    an anomaly detector using Holt-Winters predictions to identify abnormal traffic patterns based on number of flows and number of packets to and from the host,
    a behavioral detector examining some number of user activities looking for inconsistencies, and
    a trend detector examining various trends from a variety of feeds and increasing vigilance when risk is perceived.

8. The system of claim 6, further comprising a root translator, wherein the plurality of computer processors run on a plurality of servers, each computer processor residing on each server, one of the computer processors being dedicated to handling data from a network intrusion detection system (NIDS) and any messages from a firewall, other computer processors providing log analyzers for the other servers focusing on authorization logs and Web logs, and
wherein results from the plurality of computer processors being fed into the root translator, whereby making the events in the root translator the events with the most information.

\* \* \* \* \*